July 2, 1935.  E. L. FIX ET AL  2,006,347
LAMINATED GLASS
Filed April 11, 1933
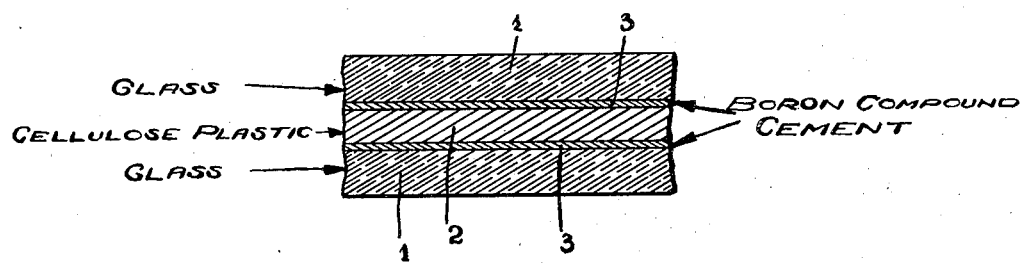
INVENTORS
EARL L. FIX and
JOHN C. ZOLA.
BY
Bradley + Bee
ATTORNEYS Patented July 2, 1935

2,006,347

UNITED STATES PATENT OFFICE 2,006,347

LAMINATED GLASS

Earl L. Fix, New Kensington, and John C. Zola, Tarentum, Pa., assignors to Duplate Corporation, a corporation of Delaware Application April 11, 1933, Serial No. 665,549

4 Claims. (Cl. 49—81)

The invention relates to laminated glass which ordinarily comprises two sheets of glass cemented to the opposite sides of a sheet of cellulose plastic, such as cellulose acetate or ethyl cellulose. Very considerable difficulty is encountered in cementing glass to cellulose acetate and to ethyl cellulose, and the invention is directed primarily to use with these materials, although the invention is applicable to use with other cellulose products, as hereinafter more fully set forth. In connection with certain of the plastics other than the acetate and ethyl cellulose, the use of the invention is of less importance, because of the availability of other satisfactory cements, such as gelatin and casein. The objects of the invention are the provision of laminated glass (1) which can be used under ordinary compositing conditions, namely at temperatures ranging from 240 deg. to 275 deg. F.; (2) which under break tests shows results comparable with those now secured when cellulose nitrate is composited using gelatin as a cement; and (3) which shows good adhesion under continued exposure tests, such as are recognized and established in the art. A plate of laminated glass made in accordance with the invention is illustrated in the accompanying drawing, wherein:

The figure is a sectional view through the plate.

In the drawing, 1, 1 are sheets of glass; 2 is a sheet of cellulose plastic; and 3, 3 are layers of the cementing medium.

Briefly stated, the invention involves the use of compounds of boron which are water soluble or are soluble in cellulose plastic solvents. These compounds, generally speaking, have, on ordinary examination, little or no adhesive properties, and generally show little or no stickiness, such as is associated with the standard plastic adhesives, such as casein, gelatin and many of the resins, but when used between glass and cellulose ester plastic at a temperature upwards of 200 deg. F., they become powerful adhesives peculiarly suitable for use in the manufacture of laminated glass.

A specific example of a mixture which has given excellent results in adhering cellulose acetate is the following:

| | | |
|---|---|---|
| Glycerol borate | 6.25 | lbs. |
| Cellulose acetate flake | 42 | lbs. |
| Acetone | 50 | gals. |
| Diethyl phthalate | 5 | gals. |
| Diacetone alcohol | 20 | gals. |
| H₂O | 25 | gals. |

The glycerol borate is a water-soluble, synthetic resin, preferably made up of one part glycerin and one part boric acid. The acetone and diacetone alcohol are solvents of the acetate flake, and the diethyl phthalate is a plasticizer of the acetate.

The procedure in compounding the mixture is as follows:

Place acetate flake in the mixer, dissolve glycerol borate in cold water and pour on acetate in mixer, add acetone, add diacetone alcohol, and add diethyl phthalate.

In compositing, the above mixture is placed on the glass sheets in a thin film, preferably by spraying, and allowed to dry, after which the glass is composited under heat and pressure in the usual way by the hydraulic method set forth in the Sherts and Hamill Patent No. 1,781,084, the pressure employed in the final pressing being about 150 pounds per square inch, and the temperature being about 240 deg. F.

Another mixture giving good results, but omitting the plasticizer is as follows:

| | | |
|---|---|---|
| Glycerol borate | 1.5 | grams |
| Cellulose acetate flake | 5.0 | grams |
| Diacetone alcohol | 20 | c. c. |
| H₂O | 30 | c. c. |
| Acetone | 50 | c. c. |

Various borate compounds may be substituted for the glycerol borate. Among them are glyceryl bori borate, glycol bori borate, sodium tetraborate (borax), sodium perborate, boric acid, and various resins compounded from glycerin, glycol, borax, and boric acid. All of these compounds substituted for the glycerol borate, show good adhesion. The amount of boron compound may vary within a considerable range, good results having been secured with the proportions of such compounds ranging by weight from 0.5 of one per cent to 4 per cent of the weight of the mixture.

Various plasticizers may also be substituted for the diethyl phthalate; such as, butyl cellosolve phthalate, carbitol phthalate, triacetin, ethyl meta-toluene sulphonamide, ethyl para-toluene sulphonamide, diethylene glycol, dibutyl phthalate, diamyl phthalate, diacetin, triphenyl phosphate, glycol diacetate, nitrobenzine, and dibutyl carbonate.

The borate compound may be used with the dope alone in the examples above given without the admixture of any water, but such mixture is not as satisfactory since water is desirable in order to get the compound readily into solution.

However, it may be gotten into solution by the alcohol.

All of the foregoing with respect to compositing cellulose acetate, also applies to compositing ethyl cellulose except that it requires ethyl cellulose flake in place of the cellulose acetate flake. The amount of the cellulose flake employed in the dope may vary within a considerable range without affecting the result materially. The foregoing further applies to the use of the cement in connection with reinforcing sheets of benzyl cellulose, cellulose propionate and cellulose propionate acetate. In each case, when the cellulose dope is used, it contains a cellulose flake of the same composition as the cellulose sheet which is to be used as a reinforcing for the glass.

What we claim is:

1. A laminated plate comprising a pair of glass sheets cemented to the opposite sides of a sheet of cellulose plastic with a cement comprising a boron compound and a cellulose derivative similar in composition to the plastic sheet.

2. A laminated plate comprising a pair of glass sheets cemented to the opposite sides of a sheet of cellulose acetate plastic with a cement comprising a boron compound and a cellulose derivative similar in composition to the plastic sheet.

3. A laminated plate comprising a pair of glass sheets cemented to the opposite sides of a sheet of cellulose acetate plastic with a cement comprising boric acid and a cellulose derivative similar in composition to the plastic sheet.

4. A laminated plate comprising a pair of glass sheets cemented to the opposite sides of a sheet of cellulose acetate plastic with a cement comprising a sodium borate compound and a cellulose derivative similar in composition to the plastic sheet.

EARL L. FIX.
JOHN C. ZOLA.